J. T. HAILE.
Hand Press for Fruit, &c.
No. 232,029. Patented Sept. 7, 1880.
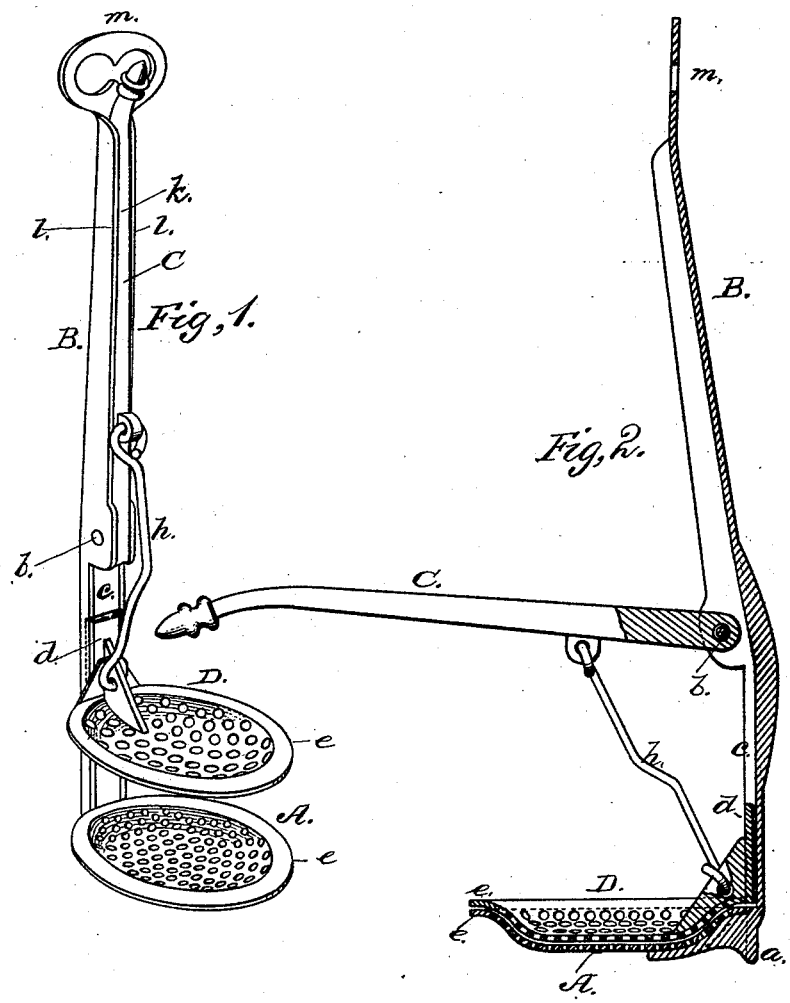

UNITED STATES PATENT OFFICE.

JAMES T. HAILE, OF WHITESBOROUGH, TEXAS.

HAND-PRESS FOR FRUIT, &c.

SPECIFICATION forming part of Letters Patent No. 232,029, dated September 7, 1880.

Application filed January 31, 1880.

*To all whom it may concern:*

Be it known that I, JAMES T. HAILE, of Whitesborough, in the county of Grayson and State of Texas, have invented a new and valuable Improvement in Hand-Presses for Fruit, Cracklings, &c.; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my improved hand-press, and Fig. 2 is a longitudinal vertical section thereof.

This invention has relation to domestic hand-presses for fruit, cracklings, hominy, and other articles whereof it is necessary to separate the liquid from the more solid portions; and it consists in the construction and novel arrangement of a lower perforated bowl or receptacle having a rigid handle extending at right angles to the general plane of the bowl, and an upper perforated presser-head conforming in shape to the bowl, and having a sliding attachment to the handle of the bowl, a lever-handle pivoted to the main handle, a connecting-rod from said lever to the presser-head, and a spring-catch to hold the lever up to the main handle when the presser-head is drawn up, all as hereinafter shown and described.

In this invention the object is to effect a pressure by direct and vertical action, so that while the liquid will be effectually discharged there will be no liability to force the solids out, causing them to fall into the strained liquid, and requiring the work to be done over again.

In the accompanying drawings, the letter A designates the bowl or receptacle, which is arranged at the lower end of and at right angles to the handle B, these two parts being strongly and rigidly connected, so as to sustain the pressure. Usually the end $a$ of the handle is extended downward to a level with the bottom of the bowl, so as to form a base-support for the handle when operating the lever C.

This lever is pivoted to the handle at $b$ above the bowl, and below the pivotal point the handle is provided with a slideway, $c$, to receive the slide-lug $d$ of the presser-head D, which is strongly braced to said lug by a rib-connection or otherwise. This presser-head is made to conform to the shape of the bowl below, being usually convex on its under side, so as to fit the concavity of the bowl and thereby exert a central as well as a marginal pressure.

Both bowl and presser-head are perforated, as indicated, and should be made with stout rims or margins $e$ to strengthen them. Usually the perforations of the presser-head are made larger than those of the bowl, so that when the two are separated a double straining can be effected.

The lever C is connected to the presser-head near its slide-lug, so that the latter will move easily in the slideway by a connecting-rod, $h$.

Above the pivotal point the handle B is provided with a spring-catch, which is preferably made in the form of a channel, $k$, with spring-walls $l$, designed to receive the lever between them and hold it up to its place in the channel or recess, so that it will be out of the way and not liable to be casually thrown down. The end of the handle is usually provided with a grasping-loop, $m$.

The operation of my invention is as follows: When in use for separating lard from cracklings, the lower bowl, A, is dipped into the boiling mass, and, acting as a dipper, catches up the cracklings. The lard is thoroughly squeezed out the perforations $e$ by sliding down the upper bowl, D, through the medium of the lever C. After the same has been squeezed, the cracklings are thrown out to one side.

When in use with cooked fruits, &c., the mode is substantially the same.

To squeeze lemons and the like, they are placed by hand between the bowls, and the squeezing operation is the same as above stated.

Having described this invention, what I claim, and desire to secure by Letters Patent, is—

The hand-press consisting of the perforated bowl A, its upright handle B, having slideway c and spring-catch, the perforated presser-head D, its slide-lug d, the lever C, pivoted to the handle, and the connecting-rod h, extending from the lever to the presser-head near its slide-lug, substantially as specified.

In testimony that I claim the above I have hereunto subscribed my name in the presence of two witnesses.

J. T. HAILE.

Witnesses:
 PHILIP C. MASI,
 M. P. CALLAN.